(12) United States Patent
Ang et al.

(10) Patent No.: US 10,268,471 B2
(45) Date of Patent: Apr. 23, 2019

(54) METHOD FOR UPGRADING TERMINAL SYSTEM, TERMINAL, AND SYSTEM

(71) Applicant: Huawei Technologies Co., Ltd., Shenzhen (CN)

(72) Inventors: Kheng Hong Ang, Shenzhen (CN); Chaozhi Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 15/521,863

(22) PCT Filed: Mar. 24, 2015

(86) PCT No.: PCT/CN2015/074948
§ 371 (c)(1),
(2) Date: Apr. 25, 2017

(87) PCT Pub. No.: WO2016/149908
PCT Pub. Date: Sep. 29, 2016

(65) Prior Publication Data
US 2017/0249137 A1    Aug. 31, 2017

(51) Int. Cl.
*G06F 8/65* (2018.01)
*H04L 12/24* (2006.01)

(52) U.S. Cl.
CPC .............. *G06F 8/65* (2013.01); *H04L 41/082* (2013.01)

(58) Field of Classification Search
CPC ........... G06F 8/65; G06F 9/445; H04L 41/082
(Continued)

(56) References Cited

U.S. PATENT DOCUMENTS 6,308,061 B1 * 10/2001 Criss .................. G06F 8/65
                                                      455/418
6,823,259 B2 * 11/2004 Miyazawa ......... G01C 21/3632
                                                      340/988

(Continued)

FOREIGN PATENT DOCUMENTS

CN         101795203 A   *  8/2010
CN         101909084 A   * 12/2010

(Continued)

OTHER PUBLICATIONS

State et al., "Managing Multi-Configurable Terminals", 2002, IEEE (Year: 2002).*

(Continued)

*Primary Examiner* — Wei Y Zhen
*Assistant Examiner* — Junchun Wu
(74) *Attorney, Agent, or Firm* — Conley Rose, P.C.

(57) ABSTRACT

A method includes obtaining, by a first terminal, version information of a second terminal, where the version information of the second terminal includes at least a device model and a version number of system software of the second terminal; if the device model of the second terminal is compatible with a device model of the first terminal, determining, by the first terminal according to the version number of the system software of the second terminal and a version number of system software of the first terminal, whether system upgrade is to be performed on the first terminal; and if the first terminal determines that system upgrade is to be performed, obtaining, by the first terminal from the second terminal, system software data indicated by the version number of the system software of the second terminal.

10 Claims, 8 Drawing Sheets

(58) Field of Classification Search
USPC .......................................................... 717/170
See application file for complete search history.

(56) References Cited

U.S. PATENT DOCUMENTS

| | | | | |
|---|---|---|---|---|
| 6,968,184 | B2* | 11/2005 | Criss ......................... | G06F 8/65 455/418 |
| 7,500,235 | B2* | 3/2009 | Maynard .................... | G06F 8/65 717/171 |
| 8,561,052 | B2 | 10/2013 | Kogan et al. | |
| 9,021,460 | B2* | 4/2015 | Yoshida ..................... | G06F 8/65 717/168 |
| 2001/0023374 | A1 | 9/2001 | Yashiki et al. | |
| 2004/0123281 | A1* | 6/2004 | Olrik ......................... | G06F 8/65 717/168 |
| 2004/0215755 | A1* | 10/2004 | O'Neill ..................... | G06F 8/654 717/170 |
| 2005/0210458 | A1* | 9/2005 | Moriyama ................. | G06F 8/65 717/168 |
| 2006/0048141 | A1 | 3/2006 | Persson et al. | |
| 2006/0069836 | A1* | 3/2006 | Seo ........................... | G06F 8/65 710/302 |
| 2007/0226334 | A1* | 9/2007 | Aoyagi ..................... | H04W 8/245 709/224 |
| 2008/0134166 | A1* | 6/2008 | Gallo ......................... | G06F 8/64 717/173 |
| 2008/0216066 | A1* | 9/2008 | Oh ............................ | G06F 8/658 717/173 |
| 2009/0055534 | A1* | 2/2009 | Sadja ........................ | G06F 8/65 709/226 |
| 2010/0077024 | A1 | 3/2010 | Yun | |
| 2010/0315670 | A1 | 12/2010 | Kojima | |
| 2012/0144279 | A1 | 6/2012 | Rabeler | |
| 2014/0057620 | A1 | 2/2014 | Lin | |
| 2014/0355057 | A1* | 12/2014 | Jang .......................... | G06K 7/10297 358/1.15 |
| 2015/0154015 | A1* | 6/2015 | Ukai ......................... | H04M 1/72525 717/170 |

FOREIGN PATENT DOCUMENTS

| | | | | |
|---|---|---|---|---|
| CN | 102232304 A | * | 11/2011 | ............. G06F 8/654 |
| CN | 102232304 A | | 11/2011 | |
| CN | 103207790 A | * | 7/2013 | |
| CN | 103207790 A | | 7/2013 | |
| JP | 2001263156 A | | 9/2001 | |
| JP | 2006340196 A | | 12/2006 | |
| JP | 2009211260 A | | 9/2009 | |
| JP | 2010128512 A | | 6/2010 | |
| JP | 2011002874 A | | 1/2011 | |
| KR | 20040084530 A | | 10/2004 | |
| KR | 20050031168 A | | 4/2005 | |
| KR | 20080076835 A | | 8/2008 | |
| KR | 20120063455 A | | 6/2012 | |
| KR | 20160068533 A | * | 6/2016 | ............. H04W 4/02 |
| WO | WO-2013004059 A1 | * | 1/2013 | ............. H04W 8/245 |

OTHER PUBLICATIONS

Holland et al., "Dynamic Scalable Software Downloads for Mobile Terminal Mass-upgrades", 2007, 16th IST Mobile and Wireless Communications (Year: 2007).*
Rümmler et al., "End-to-End IP Multicast for Software Upgrades of Reconfigurable User Terminals within IMT-2000/UMTS Networks", 2002, IEEE (Year: 2002).*
Moessner et al., "Software download enabling terminal reconfigurability", May 2002, SpringerLink, vol. 57, Issue 5-6, pp. 457-479 (Year: 2002).*
Machine Translation and Abstract of Chinese Publication No. CN103207790, Jul. 17, 2013, 18 pages.
Foreign Communication From a Counterpart Application, PCT Application No. PCT/CN2015/074948, English Translation of International Search Report dated Dec. 22, 2015, 2 pages.
Machine Translation and Abstract of Korean Publication No. KR20040084530, Oct. 6, 2004, 8 pages.
Foreign Communication From a Counterpart Application, Korean Application No. 10-2017-7012321, Korean Office Action dated Feb. 9, 2018, 6 pages.
Foreign Communication From a Counterpart Application, Korean Application No. 10-2017-7012321, English Translation of Korean Office Action dated Feb. 9, 2018, 4 pages.
Machine Translation and Abstract of Japanese Publication No. JP2006340196, Dec. 14, 2006, 19 pages.
Machine Translation and Abstract of Japanese Publication No. JP2009211260, Sep. 17, 2009, 19 pages.
Machine Translation and Abstract of Japanese Publication No. JP2010128512, Jun. 10, 2010, 16 pages.
Foreign Communication From a Counterpart Application, Japanese Application No. 2017-544810, Japanese Office Action dated Jun. 11, 2018, 5 pages.
Foreign Communication From a Counterpart Application, Japanese Application No. 2017-544810, English Translation of Japanese Office Action dated Jun. 11, 2018, 6 pages.
Foreign Communication From a Counterpart Application, European Application No. 15885847.2, Extended European Report dated Dec. 8, 2017, 10 pages.
Machine Translation and Abstract of Korean Publication No. KR20050031168, Apr. 6, 2005, 14 pages.
Foreign Communication From a Counterpart Application, Korean Application No. 10-2017-7012321, Korean Notice of Allowance and Brief Translation dated Jul. 3, 2018, 3 pages.

* cited by examiner

METHOD FOR UPGRADING TERMINAL SYSTEM, TERMINAL, AND SYSTEM

CROSS-REFERENCE TO RELATED APPLICATIONS

This application is a national stage of international application no. PCT/CN2015/074948, filed on Mar. 24, 2015, which is hereby incorporated by reference in its entirety.

TECHNICAL FIELD

The present disclosure relates to the communications field, and in particular, to a method for upgrading a terminal system, a terminal, and a system.

BACKGROUND

Software upgrade may include two types: system upgrade and application program upgrade. The system upgrade refers to that a system of a terminal is replaced with a system of a higher version e.g., the Android 4.0 system in an Android mobile phone is replaced with the Android 5.0 system. The application program upgrade refers to that application software of a newest version is downloaded and installed, so that a user experiences a newest application function.

The system upgrade may include local upgrade and online upgrade. The local upgrade refers to that a user downloads system software of a new version to a local computer, a terminal is then connected to the computer by using a cable, and the system software is upgraded according to an operation guide indicated by the new version. However, when the system software of the new version is obtained, a special-purpose tool, command, or password is usually needed. Therefore, a common user usually needs to go to a service outlet of the terminal to complete local upgrade with the help of a professional maintenance engineer.

The online upgrade refers to that after being connected to a data network, a terminal regularly queries system software of various versions that is stored in a version server. When system software, which matches a device model of the terminal, of a new version is found, with a permission of a user, the system software of the new version is locally downloaded from the version server, so that a system upgrade process is completed.

It may be seen that, when the local upgrade is performed, because the upgrade needs to be completed at a specified outlet of the terminal, excessive service costs and time costs are caused. When the online upgrade is performed, the terminal has to depend on the version server to complete upgrade of the system software. Once network quality is poor or the version server encounters a failure, the terminal cannot complete the system upgrade in time.

SUMMARY

Embodiments of the present disclosure provide a method for upgrading a terminal system, a terminal, and a system, so as to resolve a problem that online upgrade cannot be performed when no version server is deployed, and reduce service costs and time costs of system upgrade.

To achieve the foregoing objective, the following technical solutions are used in the embodiments of the present disclosure.

According to a first aspect, an embodiment of the present disclosure provides a method for upgrading a terminal system, including obtaining, by a first terminal, version information of a second terminal, where the version information of the second terminal includes at least a device model and a version number of system software of the second terminal; if the device model of the second terminal is compatible with a device model of the first terminal, determining, by the first terminal according to the version number of the system software of the second terminal and a version number of system software of the first terminal, whether system upgrade is to be performed on the first terminal; and if the first terminal determines that system upgrade is to be performed, obtaining, by the first terminal from the second terminal, system software data indicated by the version number of the system software of the second terminal, so that the first terminal completes system upgrade on the first terminal according to the obtained system software data.

With reference to the first aspect, in a first possible implementation manner of the first aspect, the determining, by the first terminal according to the version number of the system software of the second terminal and a version number of system software of the first terminal, whether system upgrade is to be performed on the first terminal includes, if the version number of the second terminal is greater than the version number of the first terminal, determining, by the first terminal, that system upgrade is to be performed on the first terminal; or if a release date indicated by the version number of the second terminal is later than a release date indicated by the version number of the first terminal, determining, by the first terminal, that system upgrade is to be performed on the first terminal.

With reference to the first aspect or the first possible implementation manner of the first aspect, in a second possible implementation manner of the first aspect, the obtaining, by the first terminal from the second terminal, system software data indicated by the version number of the system software of the second terminal includes sending, by the first terminal, a connection setup request to the second terminal, so that the second terminal establishes a first transmission connection to the first terminal according to the connection setup request; and obtaining, by the first terminal, a data packet of the system software data in the second terminal by means of the established first transmission connection.

With reference to the second possible implementation manner of the first aspect, in a third possible implementation manner of the first aspect, the obtaining, by the first terminal, a data packet of the system software data in the second terminal by means of the established first transmission connection includes, if the first transmission connection is interrupted, recording, by the first terminal, interruption point location information of the system software data, which is already received when the first transmission connection is interrupted, of the second terminal; and if the version information of the second terminal is obtained again, re-establishing, by the first terminal, the first transmission connection, so that the first terminal obtains, from the second terminal according to the interruption point location information, system software data after an interruption point location indicated by the interruption point location information.

With reference to the second possible implementation manner of the first aspect, in a fourth possible implementation manner of the first aspect, the obtaining, by the first terminal, a data packet of the system software data in the second terminal by means of the established first transmission connection includes, if the first transmission connection is interrupted, recording, by the first terminal, interruption point location information of the system software data, which is already received when the first transmission connection is interrupted, of the second terminal; if version information of a third terminal is obtained, determining, by the first terminal according to the version information of the third terminal, whether system upgrade is to be performed on the first terminal, where the version information of the third terminal includes at least a device model and a version number of system software of the third terminal; and if the first terminal determines that system upgrade is to be performed, obtaining, by the first terminal according to the interruption point location information, system software data indicated by the version number of the system software of the third terminal.

With reference to the fourth possible implementation manner of the first aspect, in a fifth possible implementation manner of the first aspect, the determining, by the first terminal according to the version information of the third terminal, whether system upgrade is to be performed on the first terminal includes, if the device model of the third terminal is compatible with the device model of the first terminal, and the version number of the system software of the third terminal is the same as the version number of the system software of the second terminal, determining, by the first terminal, that system upgrade is to be performed on the first terminal, where the obtaining, by the first terminal according to the interruption point location information, system software data indicated by the version number of the system software of the third terminal includes establishing, by the first terminal, a second transmission connection to the third terminal; and obtaining, by the first terminal from the third terminal by means of the second transmission connection according to the interruption point location information, system software data after an interruption point location indicated by the interruption point location information.

With reference to the fourth possible implementation manner of the first aspect, in a sixth possible implementation manner of the first aspect, the determining, by the first terminal according to the version information of the third terminal, whether system upgrade is to be performed on the first terminal includes, if the device model of the third terminal is compatible with the device model of the first terminal, and the version number of the system software of the third terminal is greater than the version number of the system software of the second terminal, determining, by the first terminal, that system upgrade is to be performed on the first terminal, where the obtaining, by the first terminal according to the interruption point location information, system software data indicated by the version number of the system software of the third terminal includes deleting, by the first terminal, the already obtained system software data before an interruption point location indicated by the interruption point location information; establishing, by the first terminal, a second transmission connection to the third terminal; and obtaining, by the first terminal from the third terminal by means of the second transmission connection, the system software data indicated by the version number of the system software of the third terminal.

With reference to the first aspect or any one of the first to the sixth possible implementation manners of the first aspect, in a seventh possible implementation manner of the first aspect, before the obtaining, by a first terminal, version information of a second terminal, the method further includes receiving, by the first terminal, a new-version information list sent by a server, where the new-version information list includes at least version numbers of system software corresponding to N device models, and storage addresses of system software data corresponding to the N device models, the N device models include the device model of the second terminal, and N>0.

With reference to the seventh possible implementation manner of the first aspect, in an eighth possible implementation manner of the first aspect, if the first terminal determines that system upgrade is to be performed, the method further includes obtaining, by the first terminal, the system software data at a storage address of the system software of the second terminal according to the new-version information list, so that the first terminal completes the system upgrade according to the obtained system software data.

According to a second aspect, an embodiment of the present disclosure provides a terminal, including a version information obtaining unit configured to obtain version information of a second terminal, where the version information of the second terminal includes at least a device model and a version number of system software of the second terminal; a version determining unit configured to: if the device model of the second terminal in the version information obtaining unit is compatible with a device model of a first terminal, determine, according to the version number of the system software of the second terminal and a version number of system software of the first terminal, whether system upgrade is to be performed on the first terminal; and a system upgrade unit configured to: if the version determining unit determines that system upgrade is to be performed, obtain, from the second terminal, system software data indicated by the version number of the system software of the second terminal, so that the first terminal completes system upgrade on the first terminal according to the obtained system software data.

With reference to the second aspect, in a first possible implementation manner of the second aspect, the version determining unit is configured to: if the version number of the second terminal in the version information obtaining unit is greater than the version number of the first terminal, determine that system upgrade is to be performed on the first terminal; or if a release date indicated by the version number of the second terminal in the version information obtaining unit is later than a release date indicated by the version number of the first terminal, determine that system upgrade is to be performed on the first terminal.

With reference to the second aspect or the first possible implementation manner of the second aspect, in a second possible implementation manner of the second aspect, the system upgrade unit is configured to: if the version determining unit determines that system upgrade is to be performed on the first terminal, send a connection setup request to the second terminal, so that the second terminal establishes a first transmission connection to the first terminal according to the connection setup request; and receive a data packet of the system software of the second terminal by means of the established first transmission connection.

With reference to the second possible implementation manner of the second aspect, in a third possible implementation manner of the second aspect, the terminal further includes a recording unit and a resumable data transmission unit, where the recording unit is configured to: if the first transmission connection in the system upgrade unit is interrupted, record interruption point location information of the data packet, which is already received when the first transmission connection is interrupted, of the system software of the second terminal; and the resumable data transmission unit is configured to: if the version information of the second terminal is obtained again, re-establish the first transmission connection, so that the first terminal obtains, from the second terminal according to the interruption point location information, system software data after an interruption point location indicated by the interruption point location information.

With reference to the second possible implementation manner of the second aspect, in a fourth possible implementation manner of the second aspect, the version determining unit is further configured to: if version information of a third terminal is obtained, determine, according to the version information of the third terminal, whether system upgrade is to be performed on the first terminal, where the version information of the third terminal includes at least a device model and a version number of system software of the third terminal; and the system upgrade unit is further configured to: if the first terminal determines that system upgrade is to be performed, obtain, according to the interruption point location information, system software data indicated by the version number of the system software of the third terminal.

With reference to the fourth possible implementation manner of the second aspect, in a fifth possible implementation manner of the second aspect, the version determining unit is configured to: if the device model of the third terminal is compatible with the device model of the first terminal, and the version number of the system software of the third terminal is the same as the version number of the system software of the second terminal, determine that system upgrade is to be performed on the first terminal; and the system upgrade unit is configured to: establish a second transmission connection to the third terminal; and obtain, from the third terminal by means of the second transmission connection according to the interruption point location information, system software data after an interruption point location indicated by the interruption point location information.

With reference to the fourth possible implementation manner of the second aspect, in a sixth possible implementation manner of the second aspect, the terminal further includes a deletion unit, where the version determining unit is configured to: if the device model of the third terminal is compatible with the device model of the first terminal, and the version number of the system software of the third terminal is greater than the version number of the system software of the second terminal, determine that system upgrade is to be performed on the first terminal; the deletion unit is configured to delete the already obtained system software data before an interruption point location indicated by the interruption point location information; and the system upgrade unit is configured to: establish a second transmission connection to the third terminal; and obtain, from the third terminal by means of the second transmission connection, the system software data indicated by the version number of the system software of the third terminal.

With reference to the second aspect or any one of the first to the sixth possible implementation manners of the second aspect, in a seventh possible implementation manner of the second aspect, the version information obtaining unit is further configured to receive a new-version information list sent by a server, where the new-version information list includes at least version numbers of system software corresponding to N device models, and storage addresses of system software data corresponding to the N device models, the N device models include the device model of the second terminal, and N>0.

With reference to the seventh possible implementation manner of the second aspect, in an eighth possible implementation manner of the second aspect, the system upgrade unit is further configured to: if the version determining unit determines that system upgrade is to be performed on the first terminal, obtain the system software data at a storage address of the system software of the second terminal according to the new-version information list, so that the first terminal completes the system upgrade according to the obtained system software data.

According to a third aspect, an embodiment of the present disclosure provides a terminal, where the terminal includes a processor, and a communications interface and a memory that are separately connected to the processor, where the processor is configured to: obtain version information of a second terminal by using the communications interface, where the version information of the second terminal includes at least a device model and a version number of system software of the second terminal; when the device model of the second terminal is compatible with a device model of a first terminal, determine, according to the version number of the system software of the second terminal and a version number of system software of the first terminal, whether system upgrade is to be performed on the first terminal; and if the first terminal determines that system upgrade is to be performed, obtain, from the second terminal by using the communications interface, system software data indicated by the version number of the system software of the second terminal, so that the first terminal completes system upgrade on the first terminal according to the system software data; and the memory is configured to store the system software data of the second terminal obtained from the second terminal.

With reference to the third aspect, in a first possible implementation manner of the third aspect, the processor is further configured to: if the version number of the second terminal is greater than the version number of the first terminal, determine that system upgrade is to be performed on the first terminal; or if a release date indicated by the version number of the second terminal is later than a release date indicated by the version number of the first terminal, determine that system upgrade is to be performed on the first terminal.

With reference to the third aspect or the first possible implementation manner of the third aspect, when it is determined that system upgrade is to be performed on the first terminal, the communications interface is further configured to: send a connection setup request to the second terminal, so that the second terminal establishes a first transmission connection to the first terminal according to the connection setup request; and obtain a data packet of the system software data in the second terminal by means of the established first transmission connection, and send the data packet to the memory.

With reference to the second possible implementation manner of the third aspect, in a third possible implementation manner of the third aspect, when the transmission connection is interrupted, the memory is further configured to record interruption point location information of the system software data, which is already received when the first transmission connection is interrupted, of the second terminal; and the processor is further configured to: if the version information of the second terminal is obtained again, re-establish the first transmission connection, so that the first terminal obtains, from the second terminal according to the interruption point location information, system software data after an interruption point location indicated by the interruption point location information.

With reference to the second possible implementation manner of the third aspect, in a fourth possible implementation manner of the third aspect, when the transmission connection is interrupted, the memory is further configured to record interruption point location information of the system software data, which is already received when the first transmission connection is interrupted, of the second terminal; the processor is further configured to: if the communications interface obtains version information of a third terminal, determine, according to the version information of the third terminal, whether system upgrade is to be performed on the first terminal, where the version information of the third terminal includes at least a device model and a version number of system software of the third terminal; and the communications interface is further configured to: if it is determined that system upgrade is to be performed, obtain, according to the interruption point location information, system software data indicated by the version number of the system software of the third terminal.

With reference to the fourth possible implementation manner of the third aspect, in a fifth possible implementation manner of the third aspect, the processor is further configured to: if the device model of the third terminal is compatible with the device model of the first terminal, and the version number of the system software of the third terminal is the same as the version number of the system software of the second terminal, determine that system upgrade is to be performed on the first terminal; and establish a second transmission connection to the third terminal by using the communications interface; and obtain, from the third terminal by means of the second transmission connection according to the interruption point location information, system software data after an interruption point location indicated by the interruption point location information.

With reference to the fourth possible implementation manner of the third aspect, in a sixth possible implementation manner of the third aspect, the processor is further configured to: if the device model of the third terminal is compatible with the device model of the first terminal, and the version number of the system software of the third terminal is the greater than the version number of the system software of the second terminal, determine that system upgrade is to be performed on the first terminal; delete the already obtained system software data before an interruption point location indicated by the interruption point location information; and establish a second transmission connection to the third terminal by using the communications interface; and obtain, from the third terminal by means of the second transmission connection, the system software data indicated by the version number of the system software of the third terminal.

With reference to the third aspect or any one of the first to the sixth possible implementation manners of the third aspect, in a seventh possible implementation manner of the third aspect, the communications interface is further configured to: receive a new-version information list sent by a server, and send the new-version information list to the memory, where the new-version information list includes at least version numbers of system software corresponding to N device models, and storage addresses of system software data corresponding to the N device models, the N device models include the device model of the second terminal, and N>0.

With reference to the seventh possible implementation manner of the third aspect, in an eighth possible implementation manner of the third aspect, the processor is further configured to: if the first terminal determines that system upgrade is to be performed, obtain the system software data at a storage address of the system software of the second terminal according to the new-version information list by using the communications interface, so that the first terminal completes the system upgrade according to the obtained system software data.

According to a fourth aspect, an embodiment of the present disclosure provides an upgrade system, where the system includes the terminal described in the third aspect or any one of the first to the eighth possible implementation manners of the third aspect, and the second terminal connected to the terminal.

With reference to the fourth aspect, in a first possible implementation manner of the fourth aspect, the system further includes the second terminal connected to the terminal.

With reference to the fourth aspect or the first possible implementation manner of the fourth aspect, in a second possible implementation manner of the fourth aspect, the system further includes a server connected to the terminal, where the server is configured to store a new-version information list, where the new-version information list includes at least version numbers of system software corresponding to N device models, and storage addresses of system software data corresponding to the N device models, the N device models include the device model of the second terminal, and N>0.

The embodiments of the present disclosure provide a method for upgrading a terminal system, a terminal, and a system. A first terminal determines, by obtaining a device model and a version number of system software of a second terminal, whether system upgrade is to be performed on the first terminal; and if system upgrade needs to be performed on the first terminal, obtains, from the second terminal, system software data indicated by the version number of the system software of the second terminal, so that the first terminal completes system upgrade according to the system software data. It can be seen that when system upgrade is performed on the first terminal, system upgrade can be completed without the need of going to a specified service outlet of a terminal. In addition, when system upgrade is performed on the first terminal, without the need of depending on system software data of various versions that is periodically updated in a version server, the first terminal may directly determine that a second terminal whose version number is greater than a version number of the first terminal includes system software of a new version, so that system software data of a new version is directly obtained from the second terminal to perform system upgrade.

BRIEF DESCRIPTION OF DRAWINGS

To describe the technical solutions according to the embodiments of the present disclosure more clearly, the accompanying drawings for describing the embodiments are described briefly in the following.

DESCRIPTION OF EMBODIMENTS

As used herein, terms "first" and "second" are used only for the purpose of description, and shall not be construed as indicating or implying relative importance or implying a quantity of indicated technical features. Therefore, a feature restricted by "first" or "second" may explicitly indicate or implicitly include one or more such features. In the descriptions of the present disclosure, unless otherwise provided, "multiple" means two or more than two.

Figure 1:
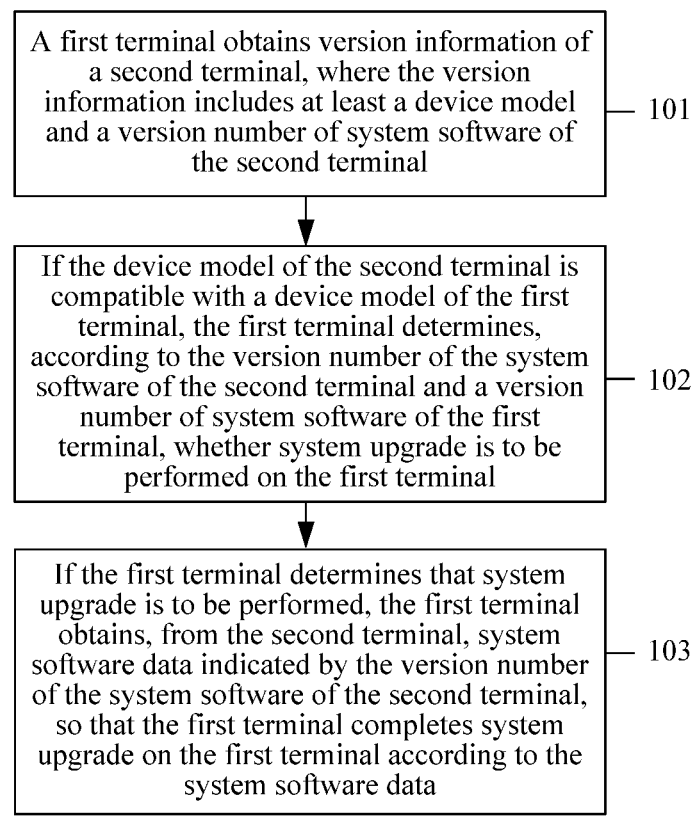
FIG. 1 is a flowchart 1 of a method for upgrading a terminal system according to an embodiment of the present disclosure.

This embodiment of the present disclosure provides a method for upgrading a terminal system. As shown in FIG. 1, the method includes.

101: A first terminal obtains version information of a second terminal, where the version information includes at least a device model and a version number of system software of the second terminal.

102: If the device model of the second terminal is compatible with a device model of the first terminal, the first terminal determines, according to the version number of the system software of the second terminal and a version number of system software of the first terminal, whether system upgrade is to be performed on the first terminal.

103: If the first terminal determines that system upgrade is to be performed, the first terminal obtains, from the second terminal, system software data indicated by the version number of the system software of the second terminal, so that the first terminal completes system upgrade on the first terminal according to the system software data.

In step 101, the first terminal may obtain the device model of the second terminal and the version number of the system software of the second terminal, to determine whether system upgrade is to be performed on the first terminal. The second terminal may be any terminal other than the first terminal.

The second terminal may periodically broadcast, in a broadcast manner, the version information of the second terminal, that is, the device model and the version number of the system software of the second terminal. In this way, the first terminal may obtain the device model of the second terminal and the version number of the system software of the second terminal according to the version information broadcast by the second terminal. Alternatively, after establishing a connection to the second terminal, the first terminal may obtain the device model of the second terminal and the version number of the system software of the second terminal from the second terminal by means of the established connection. A connection relationship between the first terminal and the second terminal may be implemented by using a wireless communication means such as a wireless network e.g., Wireless-Fidelity (WiFi) or Bluetooth, or may be implemented by means of a connection that is performed between the first terminal and the second terminal in a wired manner e.g., by using a data cable.

It should be noted that, the version numbers of the system software used in this embodiment of the present disclosure may both be version numbers of official system software that is released by a vendor or an operator of corresponding terminals.

In step 102, after the first terminal obtains the device model of the second terminal and the version number of the system software of the second terminal, the first terminal may determine, according to the device model of the second terminal and the device model of the first terminal, whether the device model of the second terminal is compatible with the device model of the first terminal.

Whether the device model of the second terminal is compatible with the device model of the first terminal is determined. The compatibility may include both software compatibility and hardware compatibility. Therefore, this embodiment of the present disclosure provides two feasible methods for determining whether the device model of the second terminal is compatible with the device model of the first terminal.

A first method: The first terminal may preset, in the first terminal, a list of device models compatible with the device model of the first terminal, as shown in Table 1. In this way, after the first terminal obtains the device model of the second terminal and the version number of the system software of the second terminal, the first terminal may query whether the device model of the second terminal is in the preset list of device models. If the device model of the second terminal is in the preset list of device models, the first terminal determines that the device model of the second terminal conforms to the device model of the first terminal. If the device model of the second terminal is not in the preset list of device models, the first terminal determines that the device model of the second terminal does not conform to the device model of the first terminal.

TABLE 1

| Operating system (optional) | Brand (optional) | Device model |
|---|---|---|
| Android system | Huawei | X3 |
| Android system | Huawei | A5100 |
| . . . | . . . | . . . |

A second method: The first terminal may further determine parameters, for example, a structure of a Printed Circuit Board (PCB) of the second terminal and layout information in the PCB circuit board, of some hardware in the second terminal according to the already obtained device model of the second terminal. If the parameters of some hardware in the second terminal are the same as parameters of the same hardware in the first terminal, the first terminal determines that the device model of the second terminal is compatible with the device model of the first terminal. Otherwise, the first terminal determines that the device model of the second terminal is incompatible with the device model of the first terminal. Alternatively, the first terminal may further determine, according to the already obtained device model of the second terminal, a hardware version number of hardware used by the second terminal. For example, the hardware version number of the hardware used by the second terminal is RB1DA6850M. In this way, if the hardware version number of the first terminal is also RB1DA6850M, the first terminal determines that the device model of the second terminal is compatible with the device model of the first terminal. Otherwise, the first terminal determines that the device model of the second terminal is incompatible with the device model of the first terminal.

In this way, the first terminal determines, according to the device model of the second terminal and the device model of the first terminal, whether the device model of the second terminal is compatible with the device model of the first terminal. If the device model of the second terminal is compatible with the device model of the first terminal, it indicates that the system software used by the second terminal is also applicable to the first terminal. In this way, the first terminal may determine, according to the version number of the system software of the second terminal and the version number of the system software of the first terminal, whether system upgrade is to be performed on the first terminal.

A version number of system software of a new version is usually greater than a version number of system software of an old version. For example, an update version of a version 4.0.0 is 5.0.0. Therefore, the first terminal may determine whether the version number of the second terminal is greater than the version number of the first terminal, to determine to perform system upgrade. If the version number of the second terminal is greater than the version number of the first terminal, the first terminal determines that system upgrade is to be performed on the first terminal.

Alternatively, in some special cases, a version number of system software of a new version is not necessarily greater than a version number of system software of an old version. In this case, the first terminal may further determine a release date of a version of the second terminal according to the version number of the second terminal. If the release date indicated by the version number of the second terminal is later than a release date indicated by the version number of the first terminal, it indicates that compared with the system software of the first terminal, the system software of the second terminal is system software of a new version. Therefore, the first terminal may determine that system upgrade is to be performed on the first terminal.

So far, the first terminal determines, according to the device model and the version number of the system software of the second terminal, whether system upgrade is to be performed on the first terminal.

In step 103, if the first terminal already determines that system upgrade is to be performed, the first terminal obtains, from the second terminal, the system software data indicated by the version number of the system software of the second terminal, so that the first terminal completes system upgrade according to the system software data.

System software refers to a system that controls and coordinates a terminal and an external device and supports development and running of application software, and is a set of various programs that do not need intervention of a user. Therefore, the system software data indicated by the version number of the system software of the second terminal may include all data needed to perform system upgrade on the first terminal, and may exist in a form of a data packet or the like.

If the first terminal already determines that system upgrade is to be performed, the first terminal may send a connection setup request to the second terminal. After receiving the connection setup request, the second terminal establishes a first transmission connection to the first terminal according to the connection setup request. For example, the first terminal establishes a first transmission connection to the second terminal in a manner of using a wireless network e.g., WiFi, Bluetooth, or the like. In this way, the second terminal may send, on the first transmission connection, the data packet of the system software data of the second terminal to the first terminal. After completing downloading of the data packet of the system software from the second terminal, the first terminal may perform system upgrade according to the data packet of the system software.

Herein, when the first terminal obtains, on the first transmission connection, the system software data of the second terminal, the first terminal may automatically perform downloading from the second terminal after the first transmission connection is established. Alternatively, after the first transmission connection is established, the first terminal triggers the second terminal to send the system software data of the second terminal to the first terminal by means of the first transmission connection.

Figure 2:
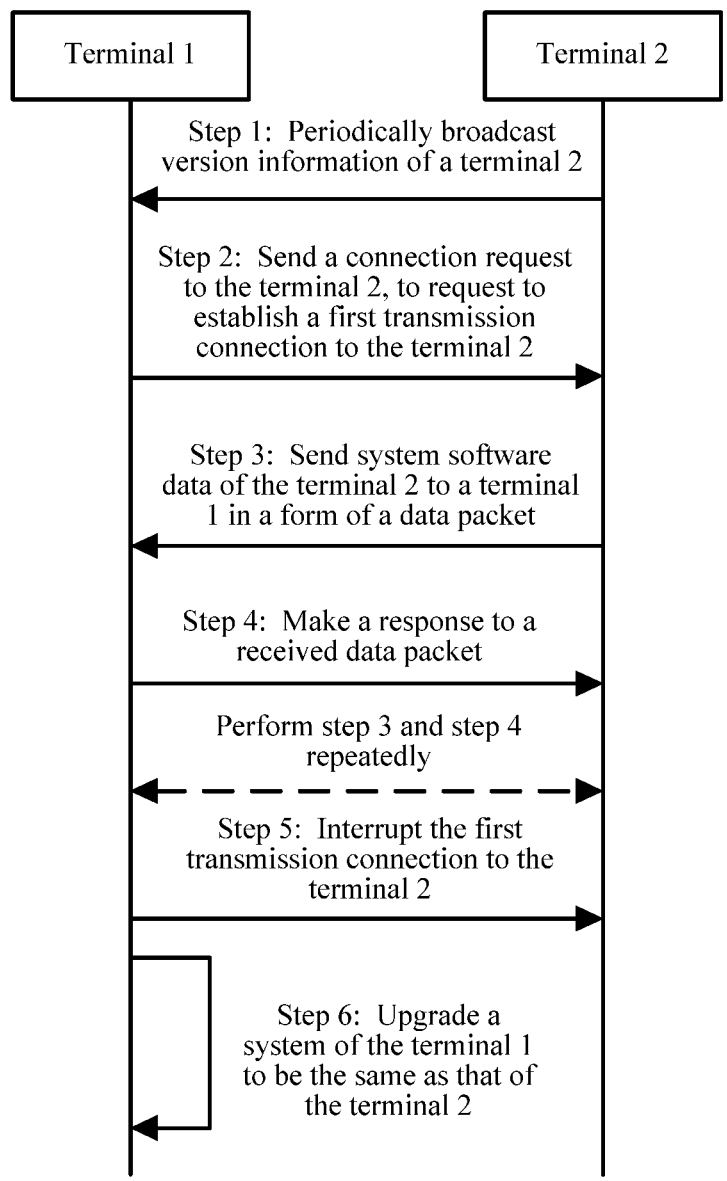
FIG. 2 is an interaction diagram 1 of a method for upgrading a terminal system according to an embodiment of the present disclosure.

For example, as shown in FIG. 2, FIG. 2 is an interaction diagram of a method for upgrading a terminal system according to an embodiment of the present disclosure. A terminal 2 includes system software data of a new version.

Step 1: The terminal 2 periodically broadcasts version information of the terminal 2, where the version information includes a device model (Huawei A910) and a version number (2.0.2) of system software.

Step 2: After receiving the version information of the terminal 2, a terminal 1 first queries whether the device model of the terminal 2 is in a list (as shown in Table 1) of device models of the terminal 1. If the device model of the terminal 2 is in the list of device models of the terminal 1, it indicates that the device model of the terminal 2 is compatible with the device model of the terminal 1. Therefore, the terminal 1 continues to compare the version number, which is in the version information, of the system software of the terminal 2 with a version number of system software of the terminal 1. Once finding that the version number of the system software of the terminal 2 is greater than the version number of the system software of the terminal 1, the terminal 1 sends a connection request to the terminal 2, to request to establish a transmission connection to the terminal 2, so as to download system software data of the terminal 2.

Step 3: After receiving the connection setup request sent by the terminal 1, the terminal 2 establishes a first transmission connection to the terminal 1, and starts to send the system software data of the terminal 2 to the terminal 1 in a packet-based manner in a form of a data packet by using a protocol such as HyperText Transfer Protocol (HTTP) or HyperText Transfer Protocol over Secure Socket Layer (HTTPS), an HTTP channel that focuses on security.

Step 4: Each time after receiving a data packet sent by the terminal 2, the terminal 1 may make a response to the received data packet, so as to notify the terminal 2 that the data packet is already received successfully.

After step 4, the terminal 1 and the terminal 2 may keep repeating the sending and responding process of the data packet of the system software data, until the last data packet of the system software data is successfully received by the terminal 1, that is, the terminal 1 successfully downloads the system software data from the terminal 2.

Step 5: The terminal 1 interrupts the first transmission connection to the terminal 2.

Step 6: The terminal 1 upgrades, according to the successfully downloaded system software data of the terminal 2, a system of the terminal 1 to be the same as that of the terminal 2.

In addition, in a process in which the first terminal obtains, from the second terminal, the system software indicated by the version number of the system software of the second terminal, a case in which a transmission connection is interrupted may occur. This case may be caused by an unstable network status or by that the second terminal leaves a connection range of the first terminal. In this case, in the method for upgrading a terminal system provided in this embodiment of the present disclosure, a third terminal may be introduced to perform system upgrade on the first terminal. This method is described in detail in a subsequent embodiment, and therefore, details are not described herein again.

This embodiment of the present disclosure provides a method for upgrading a terminal system. A first terminal determines, by obtaining a device model and a version number of system software of a second terminal, whether system upgrade is to be performed on the first terminal; and if system upgrade needs to be performed on the first terminal, obtains, from the second terminal, system software data indicated by the version number of the system software of the second terminal, so that the first terminal completes system upgrade according to the system software data. It can be seen that when system upgrade is performed on the first terminal, system upgrade can be completed without the need of going to a specified service outlet of a terminal. In addition, when system upgrade is performed on the first terminal, without the need of depending on system software data of various versions that is periodically updated in a version server, the first terminal may directly determine that a second terminal whose version number is greater than a version number of the first terminal includes system software of a new version, so that system software data of a new version is directly obtained from the second terminal to perform system upgrade.

Figure 3:
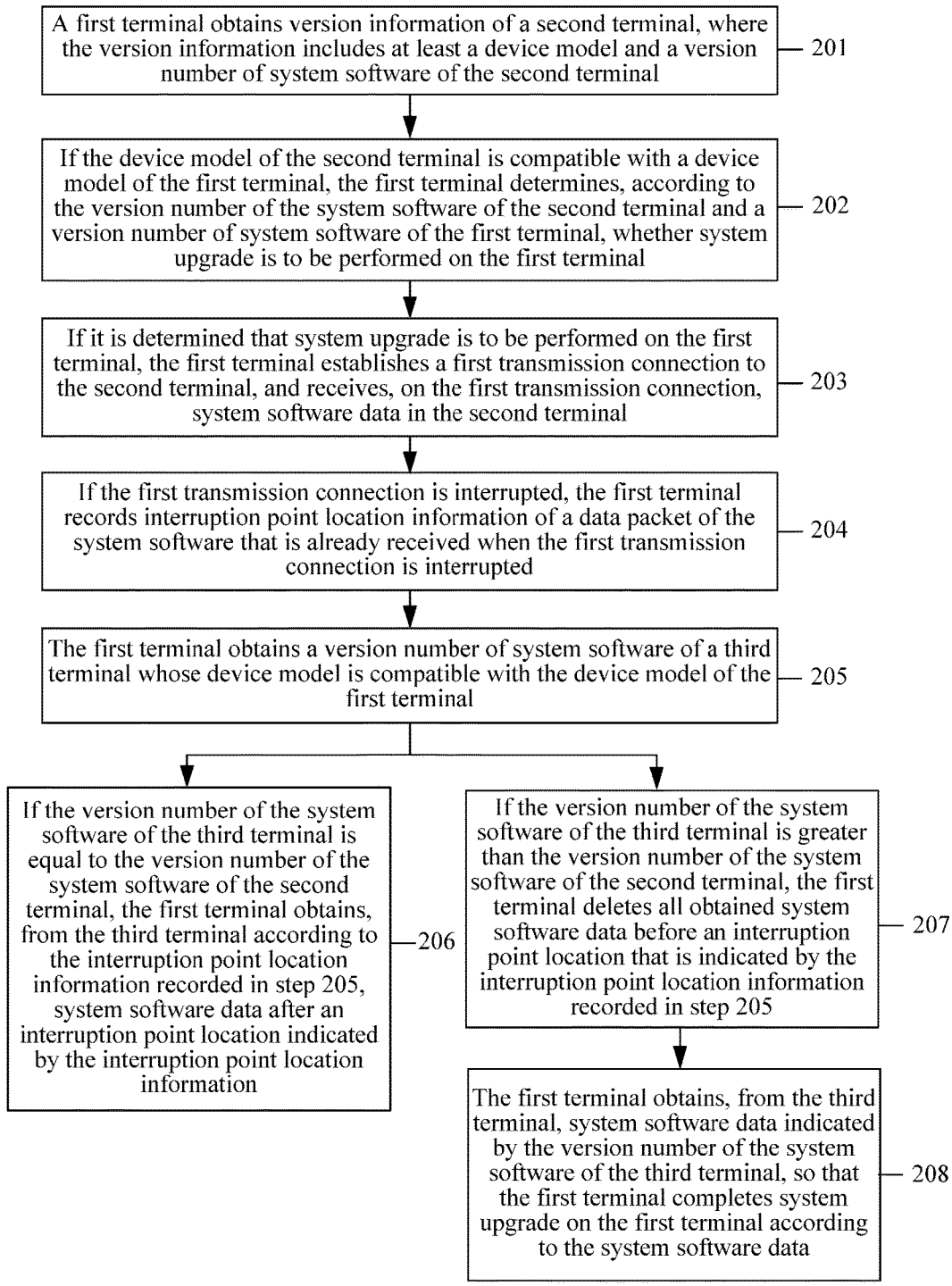
FIG. 3 is a flowchart 2 of a method for upgrading a terminal system according to an embodiment of the present disclosure.

This embodiment of the present disclosure provides a method for upgrading a terminal system. As shown in FIG. 3, the method includes.

201: A first terminal obtains version information of a second terminal, where the version information includes at least a device model and a version number of system software of the second terminal.

202: If the device model of the second terminal is compatible with a device model of the first terminal, the first terminal determines, according to the version number of the system software of the second terminal and a version number of system software of the first terminal, whether system upgrade is to be performed on the first terminal.

203: If it is determined that system upgrade is to be performed on the first terminal, the first terminal establishes a first transmission connection to the second terminal, and receives, on the first transmission connection, system software data in the second terminal.

204: If the first transmission connection is interrupted, the first terminal records interruption point location information of the system software data that is already received when the first transmission connection is interrupted.

205: The first terminal obtains a version number of system software of a third terminal whose device model is compatible with the device model of the first terminal.

206: If the version number of the system software of the third terminal is equal to the version number of the system software of the second terminal, the first terminal obtains, from the third terminal according to the interruption point location information recorded in step 205, system software data after an interruption point location indicated by the interruption point location information.

207: If the version number of the system software of the third terminal is greater than the version number of the system software of the second terminal, the first terminal deletes all obtained system software data before an interruption point location indicated by the interruption point location information recorded in step 205.

208: The first terminal obtains, from the third terminal, system software data indicated by the version number of the system software of the third terminal, so that the first terminal completes system upgrade on the first terminal according to the system software data.

In step 201, the first terminal may obtain the device model of the second terminal and the version number of the system software of the second terminal, to determine whether system upgrade is to be performed on the first terminal. The second terminal may be any terminal other than the first terminal.

For a method used by the first terminal to obtain the device model of the second terminal and the version number of the system software of the second terminal, refer to step 101 in Embodiment 1 for details. Therefore, details are not described herein again.

In step 202, after the first terminal obtains the device model of the second terminal and the version number of the system software of the second terminal, the first terminal may determine, according to the device model of the second terminal and the device model of the first terminal, whether the device model of the second terminal is compatible with the device model of the first terminal. If the device model of the second terminal is compatible with the device model of the first terminal, it indicates that the system software data used by the second terminal is also applicable to the first terminal. In this way, the first terminal may determine, according to the version number of the system software of the second terminal and the version number of the system software of the first terminal, whether system upgrade is to be performed on the first terminal.

For a method for determining whether the device model of the second terminal is compatible with the device model of the first terminal, and a method for determining, according to the version number of the system software of the second terminal and the version number of the system software of the first terminal, whether system upgrade is to be performed on the first terminal, refer to step 102 in Embodiment 1 for details. Therefore, details are not described herein again.

In step 203, if it is already determined that the version number of the system software of the second terminal is greater than the version number of the system software of the first terminal, or that a release date indicated by the version number of the second terminal is later than a release date indicated by the version number of the first terminal, it is determined that system upgrade is to be performed on the first terminal. In this case, the first terminal may send a connection setup request to the second terminal, so that the second terminal establishes a first transmission connection to the first terminal after receiving the connection setup request.

A transmission connection between the first terminal and the second terminal may be established by using a wireless communication means such as a wireless network e.g., WiFi or Bluetooth, or may be implemented by means of a connection that is performed between the first terminal and the second terminal in a wired manner e.g., by using a data cable.

After the first terminal establishes a first transmission connection to the second terminal, the second terminal may send, on the first transmission connection, the system software data of the second terminal to the first terminal in a form of a data packet. For example, if the system software data of the second terminal has a size of 100 bytes in total, and is divided into 10 data packets in total. Each data packet has 10 bytes. After the first terminal establishes the first transmission connection to the second terminal, the second terminal sequentially sends, on the first transmission connection, data packets of the system software data of the second terminal to the first terminal based on a protocol, for example, the HHTTP. In addition, to ensure reliability of data transmission, each time receiving one data packet sent by the second terminal, the first terminal may also send a response message e.g., an ACK packet, to the second terminal, to notify the second terminal that a data packet sent a previous time is already correctly received by the first terminal. In this way, after the second terminal sends all the 10 data packets of the system software of the second terminal to the first terminal, the first terminal may perform system upgrade on the system software of the first terminal according to the already obtained 10 data packets (100 bytes in total), and an upgraded system is the same as a system of the second terminal.

Certainly, in a process in which the first terminal obtains, from the second terminal, the system software data indicated by the version number of the system software of the second terminal, the first terminal and the second terminal may further prompt the user whether to use package traffic e.g., 2G traffic, 3G traffic, 4G traffic, and WiFi traffic, to which the first terminal and the second terminal have subscribed to perform a transmission process of the system software data. If the user instructs to use the package traffic to which the first terminal and the second terminal have subscribed to transmit the system software data of the second terminal, the package traffic to which the first terminal and the second terminal have subscribed is used according to the instruction of the user to transmit the system software data of the second terminal.

In step 203, in a process in which the first terminal obtains, from the second terminal, the system software data indicated by the version number of the system software of the second terminal, a case in which the first transmission connection is interrupted may occur. This case may be caused by an unstable network status, or by that the second terminal leaves a connection range of the first terminal. In this case, the first terminal may perform step 204 to step 208.

If the first terminal does not receive, within a preset time, the system software data sent by the second terminal, the first terminal determines that the first transmission connection established to the second terminal is interrupted. In this case, the first terminal may record the interruption point location information of the system software data, which is already received when the first transmission connection is interrupted, of the second terminal.

The interruption point location information may include a quantity and sizes of data packets that are sent by the second terminal and that are already received by the first terminal, or a quantity of bytes of the already received system software data of the second terminal. For example, after receiving a $5^{th}$ data packet sent by the second terminal, the first terminal receives, within 30 seconds, no more data packet sent by the second terminal. Therefore, the first terminal determines that the first transmission connection established to the second terminal is interrupted, and records the current interruption point location information that the $5^{th}$ data packet of the system software data of the second terminal is already obtained. The $5^{th}$ data packet has 50 bytes in total, so that the first terminal may perform resumable data transmission according to the recorded interruption point location information when downloading the same system software data a next time. In this way, overheads in a data transmission process are reduced, and transmission efficiency is improved.

Alternatively, for example, after receiving the $5^{th}$ data packet sent by the second terminal, the first terminal receives, within 30 seconds, no more data packet sent by the second terminal, and the first terminal may determine that the first transmission connection established to the second terminal is interrupted, and content e.g., the data packet is used to indicate interface setting information of a system, of the $5^{th}$ data packet is read. In this way, the first terminal may record the interruption point location information that the interface setting information of the system software of the second terminal is already obtained, so that the first terminal may perform resumable data transmission according to the recorded interruption point location information when downloading the same system software a next time. In this way, overheads in a data transmission process are reduced, and transmission efficiency is improved.

In step 205, if the first transmission connection is interrupted, and the first terminal already records the interruption point location information of the system software data that is already received when the transmission connection is interrupted, the first terminal may obtain the version information of the third terminal, and determine, according to the device model and the version number of the system software of the third terminal that are carried in the version information of the third terminal, whether the device model of the third terminal is compatible with the device model of the first terminal.

A specific method used by the first terminal to obtain the version information of the third terminal and determine, according to the device model and the version number of the system software of the third terminal that are carried in the version information of the third terminal, that the third terminal whose device model is compatible with the device model of the first terminal is similar to the method for determining whether the device model of the first terminal is compatible with the device model of the second terminal in step 101 and step 102 that are in Embodiment 1. Therefore, details are not described herein again.

It should be noted that the third terminal may be any terminal other than the first terminal. That is, the third terminal may be the second terminal used in step 201 to step 203. For example, the second terminal leaves a connection range of the first terminal, causing interruption of the first transmission connection between the first terminal and the second terminal. However, after a period of time, the second terminal may enter the connection range of the first terminal again. In this way, the first terminal may obtain the version information of the second terminal again.

Further, after the first terminal obtains the version number of the system software of the third terminal whose device model is compatible with the device model of the first terminal, if the version number of the system software of the third terminal is equal to the version number of the system software of the second terminal, the first terminal performs step 206. If the version number of the system software of the third terminal is greater than the version number of the system software of the second terminal, the first terminal performs step 207 and step 208.

In step 206, if the version number of the system software of the third terminal is equal to the version number of the system software of the second terminal, the first terminal may establish a second transmission connection to the third terminal, so as to obtain, from the third terminal according to the interruption point location information recorded in step 205, system software data after an interruption point location indicated by the interruption point location information.

For a method used by the first terminal to establish a second transmission connection to the third terminal, refer to the method used by the first terminal to establish a first transmission connection to the second terminal, and details are not described herein again.

After the first terminal obtains the third terminal whose device model is compatible with the device model of the first terminal, the first terminal may compare the version number, which is carried in the version information of the third terminal, of the system software with the version number, which is already received by the first terminal in step 201 to step 203, of the system software of the second terminal. If the version number of the system software of the third terminal is equal to the version number of the system software of the second terminal, it indicates that the system software data of the third terminal is the same as the system software data of the second terminal, and the first terminal may continue to obtain, from the third terminal, the system software data that has not been completely downloaded. Certainly, the first terminal may further compare a release date indicated by the version number of the system software of the third terminal with a release date indicated by the version number of the system software of the second terminal. If the release dates of the system software of the third terminal and the second terminal are the same, it also indicates that the system software data of the third terminal is the same as the system software data of the second terminal, and the first terminal may continue to obtain, from the third terminal, the system software data that has not been completely downloaded.

After establishing the second transmission connection to the third terminal, the first terminal searches for, according to the interruption point location information recorded in step 205, the data packet indicated by interruption point location information in the system software of the third terminal. In this way, the first terminal may obtain, from the third terminal by means of the second transmission connection, the data packet of the system software data after the data packet indicated by the interruption point location information. For example, the interruption point location information recorded by the first terminal is the already received 5$^{th}$ data packet, which is sent by the second terminal, of the system software. Because the system software data of the third terminal is the same as the system software data of the second terminal, the first terminal may obtain a 6$^{th}$ data packet of the system software data in the third terminal according to the interruption point location information, until all data packets in the third terminal are obtained. In this way, the first terminal may perform system upgrade on a system of the first terminal according to the system software data obtained from the second terminal and the third terminal, and software of an upgraded system is the same as that of the second terminal and the third terminal.

It should be noted that, a connection relationship between the first terminal and the third terminal may be implemented by using a wireless communication means such as a wireless network e.g., WiFi or Bluetooth, or may be implemented by means of a connection that is performed between the first terminal and the third terminal in a wired manner e.g., by using a data cable.

Certainly, when the first terminal and the third terminal perform transmission of system software, a case in which the second transmission connection is interrupted may occur. Similarly, the first terminal may perform resumable data transmission with multiple terminals according to the foregoing method, and eventually obtain system software that is the same as that of the second terminal, to perform system upgrade.

In step 207, if the version number of the system software of the third terminal is greater than the version number of the system software of the second terminal, the first terminal deletes all already obtained system software data before an interruption point location indicated by the interruption point location information recorded in step 205.

After the first terminal obtains the third terminal whose device model is compatible with the device model of the first terminal, the first terminal may compare the version number, which is carried in the version information of the third terminal, of the system software with the version number, which is already received by the first terminal in step 201 to step 203, of the system software of the second terminal. If the version number of the system software of the third terminal is greater than the version number of the system software of the second terminal, it indicates that the system of the third terminal is newer than the system of the second terminal. Therefore, the first terminal may obtain updated system software data of the third terminal from the third terminal. Certainly, the first terminal may further compare a release date indicated by the version number of the system software of the third terminal with a release date indicated by the version number of the system software of the second terminal. If the release date of the system software of the third terminal is later than the release date of the system software of the second terminal, it also indicates that the system of the third terminal is newer than the system of the second terminal. In this case, the first terminal deletes all the already obtained system software data before the interruption point location that is indicated by the interruption point location information recorded in step 205, so as to obtain updated system software data from the third terminal to perform system upgrade.

In step 208, after the first terminal deletes all the obtained system software before the interruption point location indicated by the interruption point location information recorded in step 205, the first terminal may establish a second transmission connection to the third terminal, and obtain, from the third terminal by means of the second transmission connection, the system software data indicated by the version number of the system software of the third terminal, so that the first terminal completes system upgrade according to the system software data.

For a method used by the first terminal to obtain the system software data indicated by the version number of the system software of the third terminal, refer to the method that is in step 203 and that is used by the first terminal to obtain the system software data indicated by the version number of the system software of the second terminal. Therefore, details are not described herein again.

Figure 4:
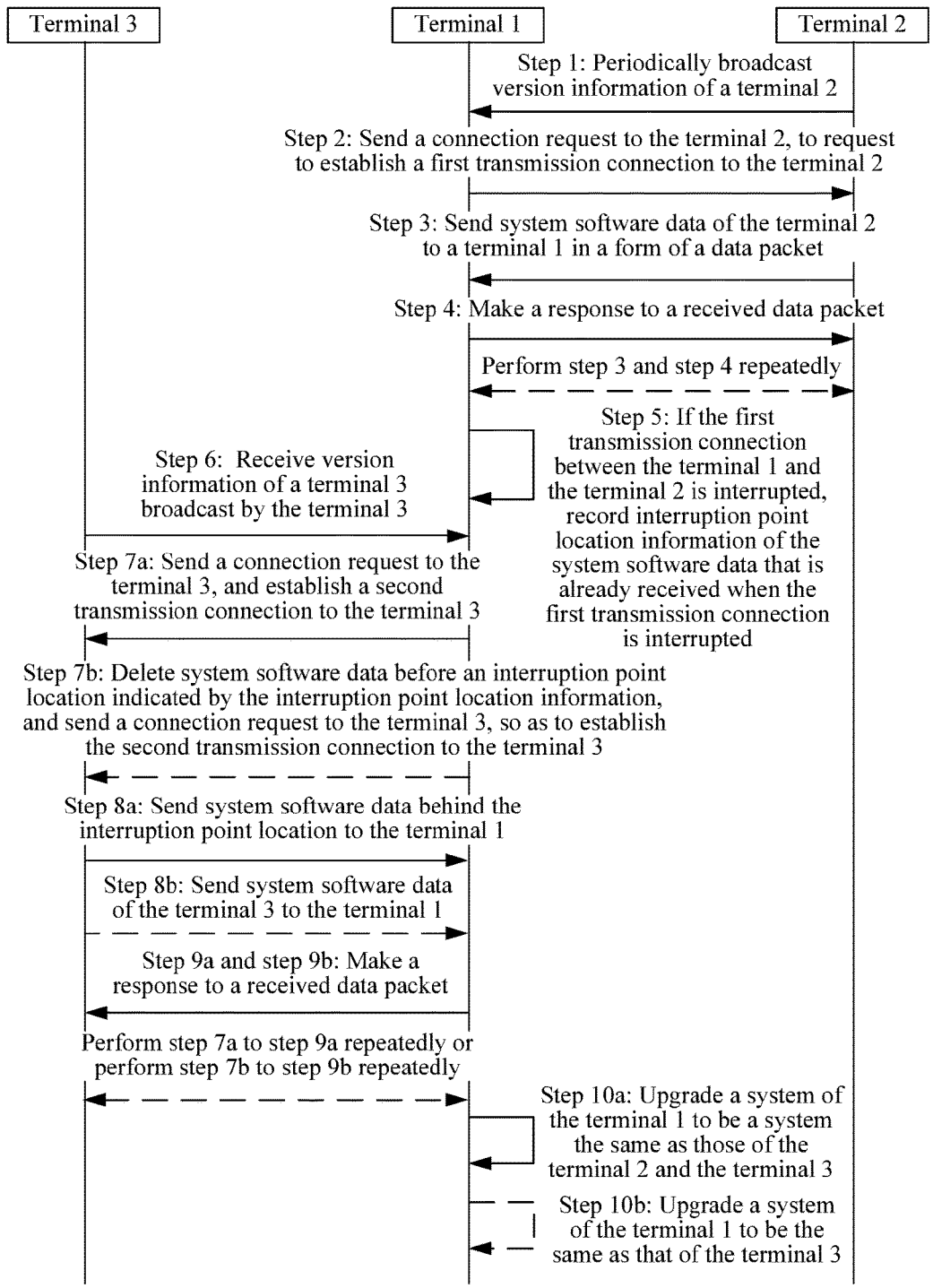
FIG. 4 is an interaction diagram 2 of a method for upgrading a terminal system according to an embodiment of the present disclosure.

For example, as shown in FIG. 4, FIG. 4 is an interaction diagram of a method for upgrading a terminal system according to an embodiment of the present disclosure. Both a terminal 2 and a terminal 3 include system software data of a new version.

Step 1: The terminal 2 periodically broadcasts version information of the terminal 2, where the version information includes a device model (huawei A910) and a version number (2.0.2) of system software.

Step 2: After receiving the version information of the terminal 2, a terminal 1 first queries whether the device model of the terminal 2 is in a list (as shown in Table 1) of device models of the terminal 1. If the device model of the terminal 2 is in the list of device models of the terminal 1, it indicates that the device model of the terminal 2 is compatible with the device model of the terminal 1. Therefore, the terminal 1 continues to compare the version number, which is in the version information, of the system software of the terminal 2 with a version number of system software of the terminal 1. Once finding that the version number of the system software of the terminal 2 is greater than the version number of the system software of the terminal 1, the terminal 1 sends a connection request to the terminal 2, to request to establish a first transmission connection to the terminal 2, so that system software data of the terminal 2 is downloaded by means of the first transmission connection.

Step 3: After receiving a connection setup request sent by the terminal 1, the terminal 2 establishes the first transmission connection to the terminal 1, and starts to send a data packet of the system software data of the terminal 2 to the terminal 1 in a packet-based manner by using a protocol such as http or https.

Step 4: Each time after receiving a data packet sent by the terminal 2, the terminal 1 may make a response to the received data packet, so as to notify the terminal 2 that the data packet is already received successfully.

Step 5: When the terminal 1 does not receive, within a preset time, a data packet sent by the terminal 2, it is determined that the first transmission connection between the terminal 1 and the terminal 2 is interrupted. In this case, the terminal 1 records interruption point location information of the system software data that is already received when the first transmission connection is interrupted.

Step 6: After the first transmission connection between the terminal 1 and the terminal 2 is interrupted, the terminal 1 receives version information of a terminal 3 broadcast by the terminal 3.

Further, if a device model of the terminal 3 is compatible with the device model of the terminal 1, and a version number of system software of the terminal 3 is equal to the version number of the system software of the terminal 2, the following step 7a to step 10a are performed.

Step 7a: The terminal 1 sends a connection request to the terminal 3, and establishes a second transmission connection to the terminal 3.

Step 8a and step 9a are similar to step 3 and step 4 in FIG. 2, in which the terminal 1 obtains, from the terminal 3, system software data after an interruption point location indicated by the interruption point location information.

Step 10a: The terminal 1 upgrades, according to the successfully downloaded system software data of the terminal 2 and the terminal 3, a system of the terminal 1 to be a system the same as those of the terminal 2 and the terminal 3.

Further, if the device model of the terminal 3 is compatible with the device model of the terminal 1, and the version number of the system software of the terminal 3 is greater than the version number of the system software of the terminal 2, the following step 7b to step 10b are performed.

Step 7b: The terminal 1 deletes system software data before the interruption point location indicated by the interruption point location information, and sends a connection request to the terminal 3, so as to establish a second transmission connection to the terminal 3.

Step 8b and step 9b are similar to step 3 and step 4 in FIG. 2, in which the terminal 1 obtains the system software data of the terminal 3 from the terminal 3.

Step 10b: The terminal 1 upgrades, according to the system software data of the terminal 3 that is already successfully downloaded, a system of the terminal 1 to be the same as that of the terminal 3.

This embodiment of the present disclosure provides a method for upgrading a terminal system. A first terminal determines, by obtaining a device model and a version number of system software of a second terminal, whether system upgrade is to be performed on the first terminal; and if system upgrade needs to be performed on the first terminal, obtains, from the second terminal, system software data indicated by the version number of the system software of the second terminal, so that the first terminal completes system upgrade according to the system software data. It can be seen that when system upgrade is performed on the first terminal, system upgrade can be completed without the need of going to a specified service outlet of a terminal. In addition, when system upgrade is performed on the first terminal, without the need of depending on system software data of various versions that is periodically updated in a version server, the first terminal may directly determine that a second terminal whose version number is greater than a version number of the first terminal includes system software of a new version, so that system software data of a new version is directly obtained from the second terminal to perform system upgrade.

Figure 5:
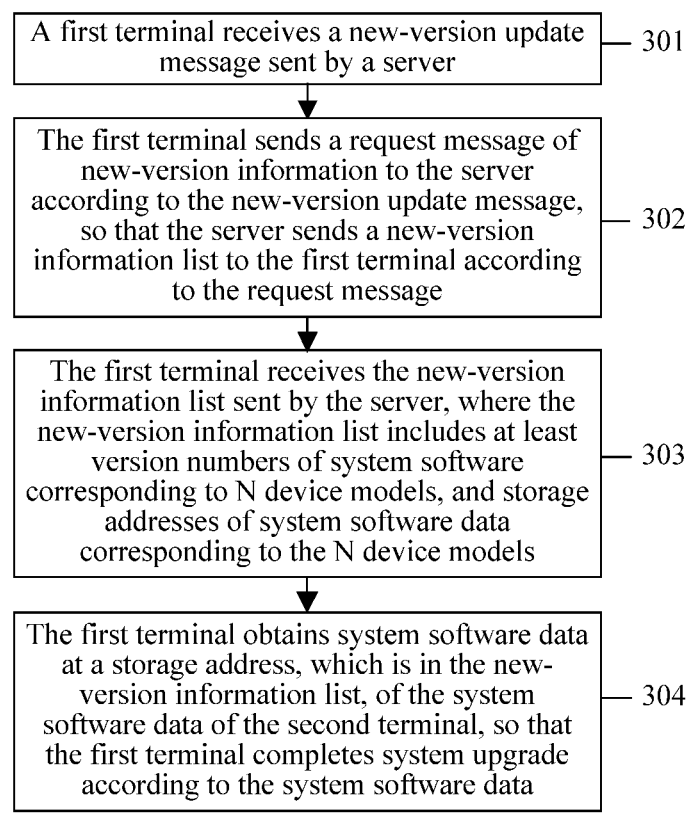
FIG. 5 is a flowchart 3 of a method for upgrading a terminal system according to an embodiment of the present disclosure.

This embodiment of the present disclosure provides a method for upgrading a terminal system. As shown in FIG. 5, the method includes.

301: A first terminal receives a new-version update message sent by a server.

302: The first terminal sends a request message of new-version information to the server according to the new-version update message, so that the server sends a new-version information list to the first terminal according to the request message.

303: The first terminal receives the new-version information list sent by the server, where the new-version information list includes at least version numbers of system software corresponding to N device models, and storage addresses of system software data corresponding to the N device models.

304: The first terminal obtains system software data at a storage address, which is in the new-version information list, of the system software data of the second terminal, so that the first terminal completes system upgrade according to the system software data.

The server used in this embodiment of the present disclosure may be a version server, and the server is configured to store and maintain system software of various device models. In addition, the server is further configured to store and maintain the new-version information list. The new-version information list includes at least the version numbers of the system software corresponding to the N device models, and the storage addresses of the system software data corresponding to the N device models. The storage address may be a network address at which system software data of a version number is stored.

As shown in FIG. 2, FIG. 2 is a possible form of the new-version information list. The new-version information list includes a version number of system software corresponding to each device model of the N device models, and a storage address of system software data indicated by a version number of each piece of system software. The server may periodically check each device model in the new-version information list, the version number of the system software, and the storage address of the system software data of the version number, to ensure time effectiveness of the new-version information list, so that a terminal whose system needs to be updated can obtain system software data of a new version according to the new-version information list.

TABLE 2

| Device model | Version number of system software | Storage address of system software data |
| --- | --- | --- |
| A110 | 2.3.1 | http://hao.360.cn/a1004 |
| X220 | 3.0.0 | http://baidu.cn/a1004 |
| ... | ... | ... |

In step 301, the server stores a version number of system software that is being used by the first terminal. Therefore, after system software of a new version of the first terminal is updated in the server, or the version number of the system software of the first terminal is updated in the new-version information list to a larger version number, the server sends a new-version update message to the first terminal, so that the first terminal learns that the system software of the first terminal needs to be updated.

In addition, the system software of the first terminal may be compatible with system software of multiple terminals having different device models (as shown in Table 1). Therefore, once system software data is updated for a device model compatible with the device model of the first terminal, the server may send the new-version update message to the first terminal.

In step 302, after receiving the new-version update message, the first terminal sends the request message of the new-version information to the server according to the new-version update message, so that the server sends the new-version information list to the first terminal according to the request message.

Optionally, after receiving the request message, the server may send the new-version information list shown in Table 2 to the first terminal.

Alternatively, after receiving the request message, the server may further send, to the first terminal, a new-version information list that is of M terminals whose device models conform to the device model of the first terminal and that is in the new-version information list.

Alternatively, after receiving the request message, the server may further send, to the first terminal, a new-version information list that is of K terminals whose version numbers of system software are greater than the version number of the first terminal and that is in a new-version information list that is of M terminals whose device models conform to the device model of the first terminal and that is in the new-version information list, where K<M<N.

In step 303, after the server sends the new-version information list to the first terminal according to the request message, the first terminal receives the new-version information list sent by the server, so as to obtain updated system software according to the new-version information list.

In step 304, the first terminal determines, from the new-version information list according to the new-version information list obtained in step 303, a storage address of the system software data of the second terminal, so as to obtain the system software data according to the storage address of the system software data of the second terminal, so that the first terminal completes system upgrade according to the system software data.

The example in step 302 in which the server sends the new-version information list shown in Table 2 to the first terminal after receiving the request message continues to be used. The first terminal determines, from the new-version information list, M terminals whose device models are compatible with the device model of the first terminal, and determines K terminals of the M terminals, where version numbers of system software of the K terminals are greater than the version number of the system software of the first terminal, as shown in FIG. 3.

TABLE 3

| Device model | Version number of system software | Storage address |
| --- | --- | --- |
| Huawei-550 | 3.0.0 | http://hao.360.cn/a1004 |
| Huawei-555 | 3.0.0 | http://baidu.cn/a1004 |
| Huawei-580 | 3.0.0 | http://10662.cn/a1004 |

In this case, the first terminal determines, from Table 3, any terminal as the second terminal, and downloads updated system software data (that is, version 3.0.0) at the storage address of the system software of the second terminal. If the upgraded system software data is downloaded successfully, the first terminal completes system upgrade according to the already downloaded system software data, that is, the system of the first terminal is upgraded to version 3.0.0.

If the updated system software data (version 3.0.0) cannot be downloaded at the storage address of the system software of the second terminal, or a downloading speed is less than a threshold, the first terminal selects any terminal other than the second terminal in Table 3 as a third terminal, and downloads the updated system software data (version 3.0.0) at a storage address of system software data of the third terminal, until the first terminal has successfully downloaded the system software data, and completes system upgrade. It may be seen that, in the method for upgrading a system of the first terminal, the first terminal does not need to establish a first transmission connection to the first terminal, and can directly obtain the system software data at the storage address at which the system software data of the second terminal is stored. In this way, when obtaining the system software of the second terminal, the first terminal is not restricted by a factor such as a geographical location, thereby improving efficiency of performing system upgrade on the first terminal.

Further, if the first terminal traverses all storage addresses in Table 3, and still cannot successfully download the updated system software data, or speeds at which the first terminal downloads system software data at all storage addresses in Table 3 are less than a threshold, the first terminal may also query whether the server stores system software data having the version number. If the server stores the system software data having the version number, the first terminal may directly download the updated system software data from the server, so as to complete system upgrade according to the downloaded system software data.

Certainly, the first terminal may strategically set that system software data of a new version is preferentially downloaded at a storage address in the new-version information list, or system software data of a new version is preferentially downloaded from the server.

Figure 6:
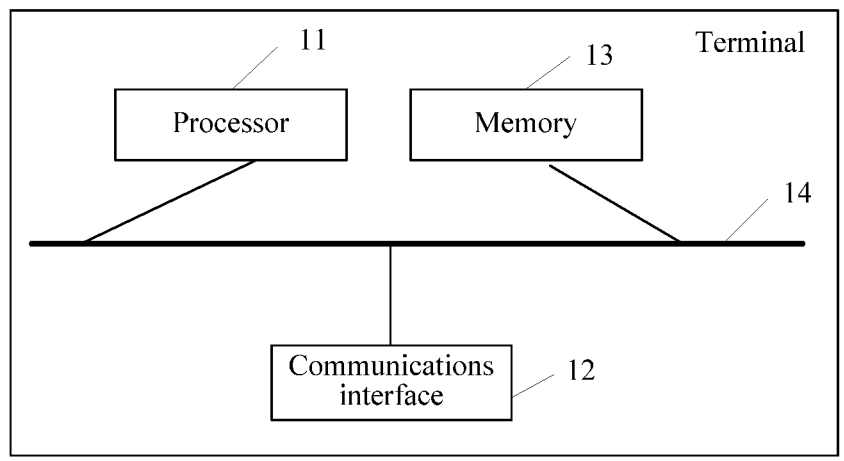
FIG. 6 is a structural diagram of hardware of a terminal according to an embodiment of the present disclosure.

FIG. 6 is a schematic diagram of hardware of a terminal according to the present disclosure.

The terminal may be a terminal device such as a mobile phone, a tablet computer, a notebook computer, an ultra-mobile personal computer (UMPC), a netbook, or a personal digital assistant (PDA).

Further, the terminal may be an intelligent terminal supporting a Bluetooth function, a data network function, or WiFi. The terminal may establish a connection to another terminal by using the Bluetooth function, the data network function, or WiFi, and complete a data transmission task on the established connection.

As shown in FIG. 6, the terminal includes a processor 11, a communications interface 12, a memory 13, and a bus 14.

The processor 11, the communications interface 12, and the memory 13 are connected to each other by using the bus 14 to perform communication.

The processor 11 is a control center of the terminal, and the processor 11 processes data received by the communications interface 12, and invokes software or a program in the memory 13, to execute various functions of the terminal.

The communications interface 12 may be implemented by an optical communications interface, an electronic communications interface, a wireless communications interface, or any combination thereof. For example, the optical communications interface may be a small form-factor pluggable (SFP) communications interface, an enhanced small form-factor pluggable (SFP+) communications interface, or a 10-gigabit small form-factor pluggable (XFP) communications interface. The electronic communications interface may be an Ethernet network interface controller (NIC). The wireless communications interface may be a wireless network interface controller (WNIC). The terminal may have multiple communications interfaces 12.

The memory 13 may be configured to store software program or data. The processor 11 executes various functional applications and data processing of the terminal by running the software program or data stored in the memory 13.

In this embodiment of the present disclosure, the processor 11 of the terminal obtains version information of a second terminal by using the communications interface 12 and stores the version information in the memory 13. The version information includes at least a device model and a version number of system software of the second terminal, and the second terminal is any terminal other than the first terminal. If the device model of the second terminal conforms to a device model of the first terminal, the processor 11 determines, according to the version number of the system software of the second terminal and a version number of system software of the first terminal, whether system upgrade is to be performed on the first terminal. If it is determined that system upgrade is to be performed on the first terminal, the processor 11 obtains, from the second terminal by using the communications interface 12, system software data indicated by the version number of the system software of the second terminal, so that the first terminal completes the system upgrade according to the system software data.

It should be noted that, in this embodiment of the present disclosure, when the first terminal obtains system software of the second terminal from the second terminal, implementation may be performed by using a wireless communication means such as a wireless network e.g., WiFi or Bluetooth, or may be implemented by means of a connection that is performed between the first terminal and the second terminal in a wired manner e.g., by using a data cable.

Further, that the processor 11 determines, according to the version number of the system software of the second terminal and the version number of the system software of the first terminal, whether system upgrade is to be performed on the first terminal may include steps: if the version number of the second terminal is greater than the version number of the first terminal, determining, by the processor 11, that system upgrade is to be performed on the first terminal; or if a release date indicated by the version number of the second terminal is later than a release date indicated by the version number of the first terminal, determining, by the processor 11, that system upgrade is to be performed on the first terminal.

Further, that the processor 11 obtains, from the second terminal by using the communications interface 12, the system software data indicated by the version number of the system software of the second terminal may include steps: sending, by the processor 11, a connection setup request to the second terminal by using the communications interface 12, so that the second terminal establishes a first transmission connection to the first terminal according to the connection setup request; and obtaining, by the communications interface 12 on the first transmission connection, a data packet of the system software data in the second terminal.

Further, when the communications interface 12 obtains, on the first transmission connection, the data packet of the system software data in the second terminal, the method may further include steps: if the first transmission connection is interrupted, recording, by the processor 11, interruption point location information of the system software data that is already received when the first transmission connection is interrupted and storing the interruption point location information in the memory 13; and if the communications interface 12 obtains the version information of the second terminal again, re-establishing, by the processor 21, the first transmission connection, so that the processor 11 obtains, from the second terminal according to the interruption point location information in the memory 13, system software data after an interruption point location indicated by the interruption point location information.

Alternatively, that the communications interface 12 obtains, on the first transmission connection, the data packet of the system software data in the second terminal may further include steps: if the first transmission connection is interrupted, recording, by the processor 11, interruption point location information of the system software data that is already received when the first transmission connection is interrupted and storing the interruption point location information in the memory 13; if the communications interface 12 obtains version information of a third terminal, sending the version information to the processor 11, and determining, by the processor 11 according to the version information of the third terminal, whether system upgrade is to be performed on the first terminal. The version information of the third terminal includes at least a device model and a version number of system software of the third terminal; if it is determined that system upgrade is to be performed, obtaining, by the processor 11 according to the interruption point location information in the memory 13, system software data indicated by the version number of the system software of the third terminal.

Further, that the processor 11 determines, according to the version information of the third terminal, whether system upgrade is to be performed on the first terminal may include a step: if the device model of the third terminal is compatible with the device model of the first terminal, and the version number of the system software of the third terminal is the same as the version number of the system software of the second terminal, determining, by the processor, that system upgrade is to be performed on the first terminal. In this case, that the processor 11 obtains, according to the interruption point location information in the memory 13, the system software data indicated by the version number of the system software of the third terminal may include steps: establishing, by the processor 11, a second transmission connection to the third terminal by using the communications interface 12; and obtaining, by the processor 11 from the third terminal according to the interruption point location information by means of the second transmission connection, system software data after an interruption point location indicated by the interruption point location information.

Similarly, that the processor 11 determines, according to the version information of the third terminal, whether system upgrade is to be performed on the first terminal may include a step: if the device model of the third terminal is compatible with the device model of the first terminal, and the version number of the system software of the third terminal is greater than the version number of the system software of the second terminal, determining, by the processor 11, that system upgrade is to be performed on the first terminal. In this case, that the processor 11 obtains, according to the interruption point location information in the memory 13, the system software data indicated by the version number of the system software of the third terminal may include steps: deleting, by the processor 11, already obtained system software data before the interruption point location indicated by the interruption point location information in the memory 13; establishing a second transmission connection to the third terminal; and obtaining, by the processor 11 from the third terminal by means of the second transmission connection, the system software data indicated by the version number of the system software of the third terminal.

Further, before the processor 11 obtains the version information of the second terminal by using the communications interface 12 and stores the version information in the memory 13, the method may further include a step: receiving, by the communications interface 12, a new-version information list sent by a server and storing the new-version information list in the memory 13. The new-version information list includes at least version numbers of system software corresponding to N device models, and storage addresses of system software data corresponding to the N device models, the N device models include the device model of the second terminal, and N>0.

If the processor 11 determines that system upgrade is to be performed on the first terminal, the processor 11 obtains the system software at a storage address of the system software of the second terminal according to the new-version information list in the memory 13 by using the communications interface, so that the first terminal completes the system upgrade according to the system software.

This embodiment of the present disclosure provides a terminal. When it is set that the terminal is a first terminal, the first terminal determines, by obtaining a device model and a version number of system software of a second terminal, whether system upgrade is to be performed on the first terminal; and if system upgrade needs to be performed on the first terminal, obtains, from the second terminal, system software data indicated by the version number of the system software of the second terminal, so that the first terminal completes system upgrade according to the system software data. It can be seen that when system upgrade is performed on the first terminal, system upgrade can be completed without the need of going to a specified service outlet of a terminal. In addition, when system upgrade is performed on the first terminal, without the need of depending on system software data of various versions that is periodically updated in a version server, the first terminal may directly determine that a second terminal whose version number is greater than a version number of the first terminal includes system software of a new version, so that system software data of a new version is directly obtained from the second terminal to perform system upgrade.

Figure 7:
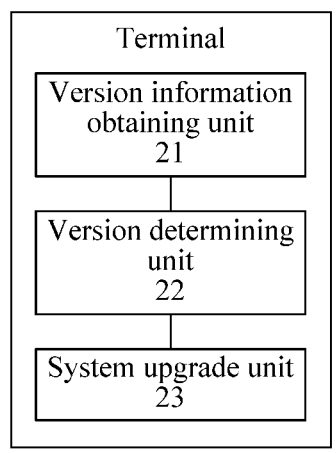
FIG. 7 is a structural diagram 1 of a terminal according to an embodiment of the present disclosure.

This embodiment of the present disclosure provides a terminal. As shown in FIG. 7, the terminal includes a version information obtaining unit 21 configured to obtain version information of a second terminal, where the version information of the second terminal includes at least a device model and a version number of system software of the second terminal, and the second terminal is any terminal; a version determining unit 22 configured to: if the device model of the second terminal in the version information obtaining unit 21 is compatible with a device model of a first terminal, determine, according to the version number of the system software of the second terminal and a version number of system software of the first terminal, whether system upgrade is to be performed on the first terminal; and a system upgrade unit 23 configured to: if the version determining unit 22 determines that system upgrade is to be performed, obtain, from the second terminal, system software data indicated by the version number of the system software of the second terminal, so that the first terminal completes system upgrade on the first terminal according to the obtained system software data.

It should be noted that, in this embodiment of the present disclosure, when the first terminal obtains system software of the second terminal from the second terminal, implementation may be performed by using a wireless communication means such as a wireless network e.g., WiFi or Bluetooth, or may be implemented by means of a connection that is performed between the first terminal and the second terminal in a wired manner e.g., by using a data cable.

Further, the version determining unit 22 is configured to: if the version number of the second terminal in the version information obtaining unit 21 is greater than the version number of the first terminal, determine that system upgrade is to be performed on the first terminal; or if a release date indicated by the version number of the second terminal in the version information obtaining unit 21 is later than a release date indicated by the version number of the first terminal, determine that system upgrade is to be performed on the first terminal.

Further, the system upgrade unit 23 is configured to: if the version determining unit 22 determines that system upgrade is to be performed on the first terminal, send a connection setup request to the second terminal, so that the second terminal establishes a first transmission connection to the first terminal according to the connection setup request; and receive a data packet of the system software of the second terminal by means of the established first transmission connection.

Figure 8:
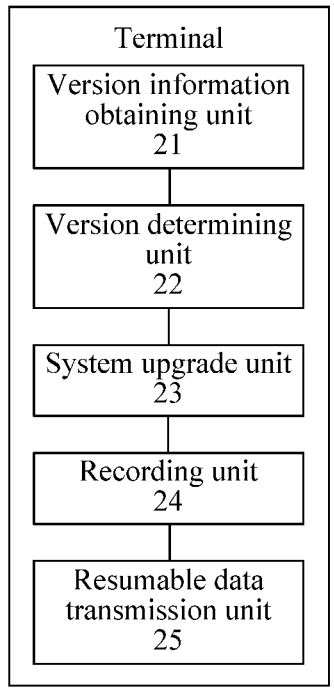
FIG. 8 is a structural diagram 2 of a terminal according to an embodiment of the present disclosure.

Further, as shown in FIG. 8, the terminal further includes a recording unit 24 and a resumable data transmission unit 25.

The recording unit 24 is configured to: if the first transmission connection in the system upgrade unit 23 is interrupted, record interruption point location information of the data packet, which is already received when the first transmission connection is interrupted, of the system software of the second terminal.

The resumable data transmission unit 25 is configured to: if the version information of the second terminal is obtained again, re-establish the first transmission connection, so that the first terminal obtains, from the second terminal according to the interruption point location information, system software data after an interruption point location indicated by the interruption point location information.

Further, the version determining unit 22 is further configured to: if version information of a third terminal is obtained, determine, according to the version information of the third terminal, whether system upgrade is to be performed on the first terminal, where the version information of the third terminal includes at least a device model and a version number of system software of the third terminal; and the system upgrade unit 23 is further configured to: if the first terminal determines that system upgrade is to be performed, obtain, according to the interruption point location information, system software data indicated by the version number of the system software of the third terminal.

The version determining unit 22 is configured to: if the device model of the third terminal is compatible with the device model of the first terminal, and the version number of the system software of the third terminal is the same as the version number of the system software of the second terminal, determine that system upgrade is to be performed on the first terminal; and the system upgrade unit 23 is configured to: establish a second transmission connection to the third terminal; and obtain, from the third terminal by means of the second transmission connection according to the interruption point location information, system software data after an interruption point location indicated by the interruption point location information.

Figure 9:
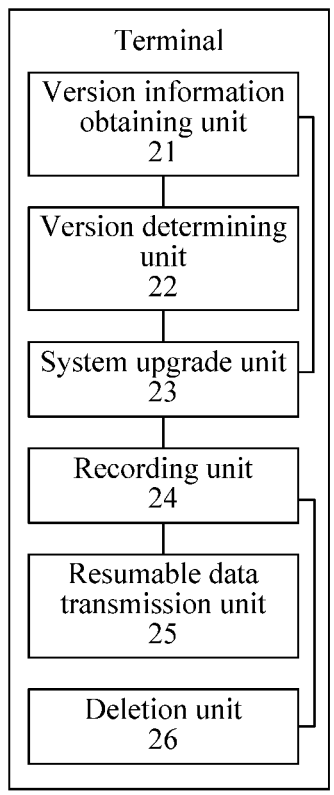
FIG. 9 is a structural diagram 3 of a terminal according to an embodiment of the present disclosure.

Further, as shown in FIG. 9, the terminal further includes a deletion unit 26, where the version determining unit 22 is configured to: if the device model of the third terminal is compatible with the device model of the first terminal, and the version number of the system software of the third terminal is greater than the version number of the system software of the second terminal, determine that system upgrade is to be performed on the first terminal; the deletion unit 26 is configured to delete the already obtained system software data before the interruption point location indicated by the interruption point location information; and the system upgrade unit 23 is configured to: establish the second transmission connection to the third terminal; and obtain, from the third terminal by means of the second transmission connection, the system software data indicated by the version number of the system software of the third terminal.

Further, the version information obtaining unit 21 is further configured to receive a new-version information list sent by a server. The new-version information list includes at least version numbers of system software corresponding to N device models, and storage addresses of system software data corresponding to the N device models, the N device models include the device model of the second terminal, and N>0.

Further, the system upgrade unit 23 is further configured to: if the version determining unit determines that system upgrade is to be performed on the first terminal, obtain the system software data at a storage address of the system software of the second terminal according to the new-version information list, so that the first terminal completes the system upgrade according to the obtained system software data.

This embodiment of the present disclosure provides a terminal. When it is set that the terminal is a first terminal, the first terminal determines, by obtaining a device model and a version number of system software of a second terminal, whether system upgrade is to be performed on the first terminal; and if system upgrade needs to be performed on the first terminal, obtains, from the second terminal, system software data indicated by the version number of the system software of the second terminal, so that the first terminal completes system upgrade according to the system software data. It can be seen that when system upgrade is performed on the first terminal, system upgrade can be completed without the need of going to a specified service outlet of a terminal. In addition, when system upgrade is performed on the first terminal, without the need of depending on system software data of various versions that is periodically updated in a version server, the first terminal may directly determine that a second terminal whose version number is greater than a version number of the first terminal includes system software of a new version, so that system software data of a new version is directly obtained from the second terminal to perform system upgrade.

Figure 10:
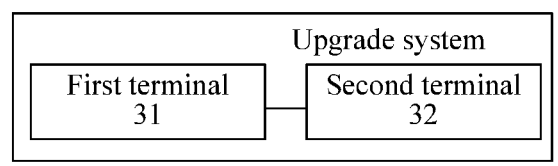
FIG. 10 is an architectural diagram 1 of an upgrade system according to an embodiment of the present disclosure.

This embodiment of the present disclosure provides an upgrade system. As shown in FIG. 10, the system includes at least the terminal provided in Embodiment 5 or 6. In this embodiment, an example of a first terminal 31 and a second terminal 32 connected to the first terminal 31 is used.

The first terminal 31 is configured to obtain version information of the second terminal 32. The version information includes at least a device model and a version number of system software of the second terminal 32. If the device model of the second terminal 32 is compatible with a device model of the first terminal 31, the first terminal 31 determines, according to the version number of the system software of the second terminal 32 and a version number of system software of the first terminal 31, whether system upgrade is to be performed on the first terminal 31. If the first terminal 31 determines that system upgrade is to be performed, the first terminal 31 obtains, from the second terminal 32, system software data indicated by the version number of the system software of the second terminal 32, so that the first terminal 31 completes system upgrade on the first terminal 31 according to the system software data.

The second terminal 32 is configured to: broadcast the version information of the second terminal 32 to the first terminal 31, so that the first terminal 31 obtains the version information of the second terminal 32; and send the system software data to the first terminal 31, so that the first terminal 31 obtains, from the second terminal 32, the system software data indicated by the version number of the system software of the second terminal 32, and the first terminal 31 completes the system upgrade according to the system software data.

It should be noted that, a connection relationship between the first terminal 31 and the second terminal 32 in this embodiment of the present disclosure may be implemented by using a wireless communication means such as a wireless network e.g., WiFi or Bluetooth, or may be implemented by means of a connection that is performed between the first terminal 31 and the second terminal 32 in a wired manner e.g., by using a data cable.

In the upgrade system provided in this embodiment of the present disclosure, a method used by the first terminal 31 to interact with the second terminal 32 may be used to implement the methods implemented in the embodiments of the present disclosure that are shown in FIG. 1 to FIG. 5, and therefore, details are not described herein again.

Figure 11:
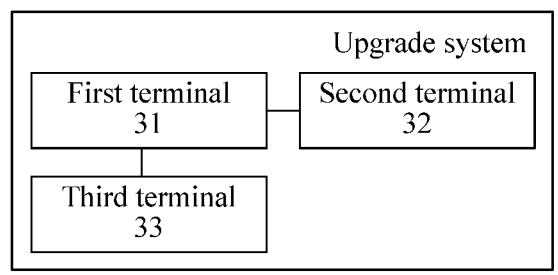
FIG. 11 is an architectural diagram 2 of an upgrade system according to an embodiment of the present disclosure.

Further, as shown in FIG. 11, the upgrade system further includes a third terminal 33 connected to the first terminal 31. For a method used by the first terminal 31 to interact with the third terminal 33, refer to Embodiment 2. Therefore, details are not described herein again.

Figure 12:
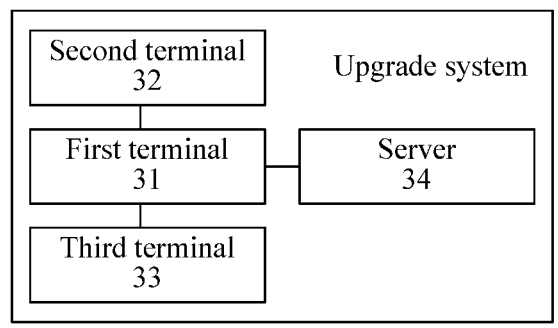
FIG. 12 is an architectural diagram 3 of an upgrade system according to an embodiment of the present disclosure.

Further, as shown in FIG. 12, the upgrade system further includes a server 34 connected to the first terminal 31. The server 34 stores a new-version information list. The new-version information list includes version numbers of system software corresponding to N device models, and storage addresses of system software data corresponding to the N device models, the N device models include the device model of the second terminal 32, and N>0.

The server 34 used in this embodiment of the present disclosure may be a version server configured to store system software of various versions. The version server further stores the new-version information list. When the version server obtains a terminal in the new-version information list includes system software of a new version, the version server may update a version number of the system software and a storage address e.g., a network address, of the system software of the terminal in the new-version information list in time. When a device model of the terminal in the new-version information list matches the device model of the first terminal 31, the version server may send an update message to the first terminal 31, so that the first terminal 31 learns that system upgrade to a new version may be performed.

After receiving the update message sent by the server 34, the first terminal 31 may send a request message to the server 34, to request the server 34 to send the new-version information list to the first terminal 31. If the first terminal receives the new-version information list, the first terminal 31 may download system software of a new version according to storage addresses of multiple pieces of system software provided in the new-version information list, to perform system upgrade. For example, the new-version information list stores a storage address of system software of a terminal A and a storage address of system software of a terminal B, and device models of the terminal A and the terminal B are the same as a device model of a terminal C. In this case, after receiving the new-version information list, the terminal C may first download updated system software at the storage address according to the storage address of the system software of the terminal A. When the downloading fails or a downloading speed is less than a threshold, the terminal C may download the updated system software at the storage address of the system software of the terminal B.

Further, if the terminal A cannot successfully download the updated system software at all the storage addresses in the new-version information list, the terminal A may also query whether the server stores system software having the version number. If the server stores the system software having the version number, the terminal A may directly download the updated system software from the server, so as to complete system upgrade according to the downloaded system software. Certainly, the terminal A may strategically set that system software of a new version is preferentially downloaded at a storage address in the new-version information list, or system software of a new version is preferentially downloaded from the server.

This embodiment of the present disclosure provides an upgrade system. A first terminal in the system determines, by obtaining a device model and a version number of system software of a second terminal, whether system upgrade is to be performed on the first terminal; and if system upgrade needs to be performed on the first terminal, obtains, from the second terminal, system software data indicated by the version number of the system software of the second terminal, so that the first terminal completes system upgrade according to the system software data. It can be seen that when system upgrade is performed on the first terminal, system upgrade can be completed without the need of going to a specified service outlet of a terminal. In addition, when system upgrade is performed on the first terminal, without the need of depending on system software data of various versions that is periodically updated in a version server, the first terminal may directly determine that a second terminal whose version number is greater than a version number of the first terminal includes system software of a new version, so that system software data of a new version is directly obtained from the second terminal to perform system upgrade.

In the several embodiments provided in this application, it should be understood that the disclosed system, mobile terminal, and method may be implemented in other manners. For example, the described mobile terminal embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, mobile terminals, or units. The indirect couplings or communication connections may be implemented in electronic, mechanical, or other forms.

The units described as separate parts may or may not be physically separate, and parts displayed as units may or may not be physical units, may be located at one position, or may be distributed on multiple network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The foregoing integrated unit may be implemented in a hardware form, or may be implemented in a form of hardware plus a software function unit.

When the foregoing integrated unit is implemented in the form of a software functional unit, the integrated unit may be stored in a computer-readable storage medium. The software function unit is stored in a storage medium and includes several instructions for instructing a computer device e.g., a personal computer, a server, a network device, or the like, to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

What is claimed is:

1. A method for upgrading a terminal system, the method comprising:
   sending, by a first terminal, a connection setup request to a second terminal;
   establishing a first transmission connection with the second terminal according to the connection setup request;
   obtaining, by the first terminal via the first transmission connection, a data packet comprising version information of the second terminal, the version information of the second terminal comprising a device model and a version number of system software of the second terminal;
   determining, by the first terminal according to the version number of the system software of the second terminal and a version number of system software of the first terminal, whether system upgrade is to be performed on the first terminal when the device model of the second terminal is compatible with a device model of the first terminal;

obtaining, by the first terminal from the second terminal, system software data indicated by the version number of the system software of the second terminal when the first terminal determines that system upgrade is to be performed;

begin upgrading the first terminal according to the obtained system software data;

recording, by the first terminal, interruption point location information when the first transmission connection is interrupted;

obtaining version information of a third terminal;

determining, by the first terminal according to the version information of the third terminal, whether system upgrade is to be performed on the first terminal, wherein the version information of the third terminal comprises at least a device model of the third terminal and a version number of system software of the third terminal;

determining, by the first terminal, that system upgrade is to be performed on the first terminal when the device model of the third terminal is compatible with the device model of the first terminal and the version number of the system software of the third terminal is equal to or greater than the version number of the system software of the second terminal;

establishing, by the first terminal, a second transmission connection to the third terminal;

obtaining, by the first terminal from the third terminal via the second transmission connection, system software data after an interruption point location indicated by the interruption point location information when the version number of the system software of the third terminal is equal to the version number of the system software of the second terminal;

deleting, by the first terminal, the already obtained system software data before an interruption point location indicated by the interruption point location information when the version number of the system software of the third terminal is greater than the version number of the system software of the second terminal; and obtaining, by the first terminal from the third terminal via the second transmission connection, the system software data indicated by the version number of the system software of the third terminal when the version number of the system software of the third terminal is greater than the version number of the system software of the second terminal.

2. The method of claim 1, wherein determining whether system upgrade is to be performed on the first terminal comprises at least one of:

determining, by the first terminal, that system upgrade is to be performed on the first terminal when the version number of the second terminal is greater than the version number of the first terminal; or determining, by the first terminal, that system upgrade is to be performed on the first terminal when a release date indicated by the version number of the second terminal is later than a release date indicated by the version number of the first terminal.

3. The method of claim 1, further comprising:

receiving, prior to obtaining version information of a second terminal by the first terminal, a new-version information list from a server, wherein the new-version information list comprises version numbers of system software corresponding to one or more device models and storage addresses of system software data corresponding to the one or more device models, and wherein the new-version information list comprises the device model of the second terminal.

4. The method of claim 3, further comprising:

obtaining, by the first terminal, the system software data at a storage address of the system software of the second terminal retrieved from the new-version information list when the first terminal determines that the system upgrade is to be performed.

5. A terminal comprising:

a communication interface;

a memory; and a processor coupled to the communication interface and the memory, wherein the processor is configured to:

send a connection setup request to a second terminal;

establish a first transmission connection with the second terminal according to the connection setup request;

obtain, via the first transmission connection, a data packet comprising version information of the second terminal, the version information of the second terminal comprising a device model and a version number of system software of the second terminal;

determine, according to the version number of the system software of the second terminal and a version number of system software of the first terminal, whether system upgrade is to be performed on the first terminal, when the device model of the second terminal is compatible with a device model of a first terminal;

obtain, from the second terminal via the communications interface, system software data indicated by the version number of the system software of the second terminal when the first terminal determines that system upgrade is to be performed;

begin the system upgrade on the first terminal according to the system software data, wherein the memory is configured to store the system software data of the second terminal;

record interruption point location information when the first transmission connection is interrupted;

obtain version information of a third terminal;

determine, according to the version information of the third terminal, whether system upgrade is to be performed on the first terminal, wherein the version information of the third terminal comprises at least a device model of the third terminal and a version number of system software of the third terminal;

determine that system upgrade is to be performed on the first terminal when the device model of the third terminal is compatible with the device model of the first terminal and the version number of the system software of the third terminal is equal to or greater than the version number of the system software of the second terminal;

establish a second transmission connection to the third terminal, obtain, from the third terminal via the second transmission connection, system software data after an interruption point location indicated by the interruption point location information when the version number of the system software of the third terminal is equal to the version number of the system software of the second terminal;

delete the already obtained system software data before an interruption point location indicated by the interruption point location information when the version number of the system software of the third terminal is greater than the version number of the system software of the second terminal; and obtain, from the third terminal via the second transmission connection, the system software data indicated by the version number of the system software of the third terminal when the version number of the system software of the third terminal is greater than the version number of the system software of the second terminal.

6. The terminal of claim 5, wherein the processor is further configured to:

determine that system upgrade is to be performed on the first terminal when the version number of the second terminal is greater than the version number of the first terminal; and determine that system upgrade is to be performed on the first terminal when a release date indicated by the version number of the second terminal is later than a release date indicated by the version number of the first terminal.

7. The terminal according to claim 5, wherein the communications interface is further configured to:

receive a new-version information list from a server; and send the new-version information list to the memory, wherein the new-version information list comprises version numbers of system software corresponding to one or more device models, and storage addresses of system software data corresponding to the one or more device models, wherein the new-version information list comprises the device model of the second terminal.

8. An upgrade system comprising:

a first terminal, a second terminal, and a third terminal, the first terminal comprising:

a communication interface;

a memory; and a processor coupled to the communication interface and the memory, wherein the processor is configured to:

send a connection setup request to the second terminal;

establish a first transmission connection with the second terminal according to the connection setup request;

obtain, via the first transmission connection, a data packet comprising version information of the second terminal, the version information of the second terminal comprising a device model and a version number of system software of the second terminal;

determine, according to the version number of the system software of the second terminal and a version number of system software of the first terminal, whether system upgrade is to be performed on the first terminal, when the device model of the second terminal is compatible with a device model of a first terminal; and obtain, from the second terminal via the communications interface, system software data indicated by the version number of the system software of the second terminal when the first terminal determines that system upgrade is to be performed;

begin the system upgrade on the first terminal according to the system software data, wherein the memory is configured to store the system software data of the second terminal;

record interruption point location information when the first transmission connection is interrupted;

obtain version information of a third terminal;

determine, according to the version information of the third terminal, whether system upgrade is to be performed on the first terminal, wherein the version information of the third terminal comprises at least a device model of the third terminal and a version number of system software of the third terminal;

determine that system upgrade is to be performed on the first terminal when the device model of the third terminal is compatible with the device model of the first terminal and the version number of the system software of the third terminal is equal to or greater than the version number of the system software of the second terminal;

establish a second transmission connection to the third terminal;

obtain, from the third terminal via the second transmission connection, system software data after an interruption point location indicated by the interruption point location information when the version number of the system software of the third terminal is equal to the version number of the system software of the second terminal;

delete the already obtained system software data before an interruption point location indicated by the interruption point location information when the version number of the system software of the third terminal is greater than the version number of the system software of the second terminal; and obtain, from the third terminal via the second transmission connection, the system software data indicated by the version number of the system software of the third terminal when the version number of the system software of the third terminal is greater than the version number of the system software of the second terminal.

9. The upgrade system of claim 8, wherein the system further comprises a third terminal connected to the terminal.

10. The upgrade system of claim 8, wherein the system further comprises a server connected to the terminal, and wherein the server is configured to store a new-version information list, wherein the new-version information list comprises version numbers of system software corresponding to one or more device models, and storage addresses of system software data corresponding to the one or more device models, wherein the new-version information list comprises the device model of the second terminal.

\* \* \* \* \*